US010432276B2

(12) United States Patent
Azogui et al.

(10) Patent No.: US 10,432,276 B2
(45) Date of Patent: Oct. 1, 2019

(54) WIRELESS LINK CONTROL AND RECOVERY USING POSITIONAL DATA

(71) Applicant: Intel IP Corporation, Santa Clara, CA (US)

(72) Inventors: Tal Azogui, Petach Tikva (IL); Yaniv Frishman, Kiryat Ono (IL); Atsuo Kuwahara, Hillsboro, OR (US); Tom Harel, Shefayim (IL)

(73) Assignee: Intel IP Corporation, Santa Clara, CA (US)

( * ) Notice: Subject to any disclaimer, the term of this patent is extended or adjusted under 35 U.S.C. 154(b) by 123 days.

(21) Appl. No.: 15/279,499

(22) Filed: Sep. 29, 2016

(65) Prior Publication Data

US 2018/0091202 A1 Mar. 29, 2018

(51) Int. Cl.
*H04W 4/02* (2018.01)
*H04B 7/06* (2006.01)
(Continued)

(52) U.S. Cl.
CPC .......... *H04B 7/0617* (2013.01); *H04W 4/023* (2013.01); *H04W 40/06* (2013.01);
(Continued)

(58) Field of Classification Search
CPC ................. H04B 7/2121; H04B 7/2123; H04J 2203/0069; H04Q 2213/394; H04W 72/04; H04W 72/12; H04W 76/00
(Continued)

(56) References Cited

U.S. PATENT DOCUMENTS 6,421,526 B1 * 7/2002 Banno ...................... H01Q 3/24
455/12.1
6,697,619 B1 * 2/2004 Hogberg ............... H04B 7/2041
455/12.1

(Continued)

FOREIGN PATENT DOCUMENTS

WO 2015060548 A1 4/2015

OTHER PUBLICATIONS

IEEE Computer Society, Part 11 : Wireless LAN Medium Access Control (MAC) and Physical Layer (PHY) Specifications, IEEE std 802.11 ac, 2013, IEEE, New York, USA.

(Continued)

*Primary Examiner* — Robert J Lopata
(74) *Attorney, Agent, or Firm* — Viering, Jentschura & Partner MBB

(57) ABSTRACT

Beamforming is used in wireless link communication to improve a wireless link through increased channel capacity and diversity by focusing a beam, such as from multiple antennas, in the direction of the receiver. Where the receiver may be capable of measurements relevant to beamforming, more particularly measurements that vary or are otherwise dependent upon changes in beamforming settings, reference to such measurements and corresponding beamforming settings may improve performance. In this Disclosure, a sink device transmits a data stream to a source device, wherein said data stream comprises the position of the sink device. The data stream may further comprise data such as link quality, heading information, or discretized location. The source device stores this data in a memory. When the wireless link deteriorates, the source device assesses its memory to select a candidate beamforming setting with some indicia of success, such as those that correspond closely to the sink device's position, the most recently used
(Continued)

beamforming settings, or beamforming settings that previously resulted in a satisfactory wireless link quality.

24 Claims, 9 Drawing Sheets

(51) Int. Cl.
  H04W 40/14 (2009.01)
  H04W 40/06 (2009.01)
  H04W 40/12 (2009.01)
  H04W 40/20 (2009.01)
  H04W 88/08 (2009.01)

(52) U.S. Cl.
  CPC ........... H04W 40/12 (2013.01); H04W 40/14 (2013.01); H04W 40/20 (2013.01); H04W 88/08 (2013.01)

(58) Field of Classification Search
  USPC ........................................................ 370/329
  See application file for complete search history.

(56) References Cited

U.S. PATENT DOCUMENTS

| | | | | |
|---|---|---|---|---|
| 8,217,843 B2* | 7/2012 | Shtrom | ............... | H01Q 1/2291 343/702 |
| 2003/0181163 A1* | 9/2003 | Ofuji | ................... | H01Q 1/1257 455/25 |
| 2006/0111149 A1 | 5/2006 | Chitrapu et al. | | |
| 2007/0135161 A1* | 6/2007 | Molnar | .................. | H04B 7/024 455/553.1 |
| 2008/0032696 A1* | 2/2008 | Choi | ................... | H01L 23/5228 455/442 |
| 2008/0084350 A1* | 4/2008 | Uno | ..................... | H04W 16/28 342/367 |
| 2009/0253438 A1* | 10/2009 | Chater-Lea | ............ | H01Q 1/242 455/456.1 |
| 2010/0220818 A1* | 9/2010 | Yamamoto | ............. | H04H 20/42 375/340 |
| 2011/0006948 A1* | 1/2011 | Larregle | ............... | H01Q 21/245 342/361 |
| 2011/0285590 A1* | 11/2011 | Wellington | ............. | G01C 21/20 342/417 |
| 2012/0013506 A1* | 1/2012 | Halavi | ...................... | B64G 3/00 342/359 |
| 2012/0058767 A1* | 3/2012 | Molnar | .................. | H04B 7/024 455/436 |
| 2012/0076032 A1* | 3/2012 | Mundarath | .......... | H04B 7/0417 370/252 |
| 2013/0090141 A1* | 4/2013 | Hottinen | ........... | H04W 72/1231 455/501 |
| 2013/0115985 A1* | 5/2013 | Davydov | ............... | H04B 7/024 455/501 |
| 2013/0137444 A1* | 5/2013 | Ozluturk | ................ | H04B 7/026 455/450 |
| 2014/0128032 A1* | 5/2014 | Muthukumar | ........... | H01Q 3/00 455/411 |
| 2014/0148173 A1 | 5/2014 | Karaoguz | | |
| 2014/0206414 A1* | 7/2014 | Oh | ....................... | H04B 7/0404 455/562.1 |
| 2014/0218236 A1* | 8/2014 | Sadeghi | ................. | H04W 16/28 342/367 |
| 2015/0341095 A1 | 11/2015 | Yu et al. | | |
| 2016/0007147 A1 | 1/2016 | Zhang et al. | | |
| 2016/0262181 A1 | 9/2016 | Lee et al. | | |
| 2017/0127398 A1* | 5/2017 | Andgart | ............... | H04W 72/046 |
| 2017/0171834 A1* | 6/2017 | Neves | ................... | H04W 16/28 |
| 2017/0187426 A1* | 6/2017 | Su | ........................ | H04B 1/3822 |
| 2017/0187430 A1* | 6/2017 | Moosavi | ................ | H04B 7/043 |
| 2017/0223749 A1* | 8/2017 | Sheldon | ............... | H04B 7/0617 |
| 2017/0238191 A1* | 8/2017 | Bahl | ..................... | H04W 16/20 370/329 |
| 2018/0041261 A1* | 2/2018 | Modarres Razavi | ....................... H04B 7/0617 | |
| 2018/0083672 A1* | 3/2018 | Alexander | ............ | H04B 7/024 |
| 2018/0083678 A1* | 3/2018 | Alexander | .......... | H04B 7/0617 |

OTHER PUBLICATIONS

International Search Report based on Application No. PCT/US2017/046405 (15 Pages) dated Nov. 22, 2017.

* cited by examiner

Position, Beamforming Setting and Quality — 701

| Position | Beamforming Setting | Quality |
|---|---|---|
| #pa | #ba | #qa |
| #pb | #bb | #qb |
| #pc | #bc | #qc |
| #pd | #bd | #qd |
| #pe | #be | #qe |
| #pf | #bf | #qf |
| #pg | #bg | #qg |

602  402  403

Position (Location and Heading), Beamforming Setting, and Quality — 901

| Location | Heading | Beamforming Setting | Quality |
|---|---|---|---|
| #la | #ha | #ba | #qa |
| #lb | #hb | #bb | #qb |
| #lc | #hc | #bc | #qc |
| #ld | #hd | #bd | #qd |
| #le | #he | #be | #qe |
| #lf | #hf | #bf | #qf |
| #lg | #hg | #bg | #qg |

Position (Location and Heading), Beamforming Setting, Quality, and Time

| Location | Heading | Beamforming Setting | Quality | Time |
|---|---|---|---|---|
| #la | #ha | #ba | #qa | hh1:mm1 |
| #lb | #hb | #bb | #qb | hh2:mm2 |
| #lc | #hc | #bc | #qc | hh3:mm3 |
| #ld | #hd | #bd | #qd | hh4:mm4 |
| #le | #he | #be | #qe | hh5:mm5 |
| #lf | #hf | #bf | #qf | hh6:mm6 |
| #lg | #hg | #bg | #qg | hh7:mm7 |

502　　902　　402　　403　　1102

WIRELESS LINK CONTROL AND RECOVERY USING POSITIONAL DATA

TECHNICAL FIELD

This Disclosure relates to the use of positional data, as transmitted within user traffic data, to more rapidly employ beamforming technology to improve wireless data links.

BACKGROUND

Beamforming plays an important role in maintaining a robust wireless data link. Where beamforming is utilized, link control generally defines a process and protocol ("training protocol") that iterates through all beamforming configurations to detect the best configuration, based on the reported receiver's signal quality. This process takes a fixed minimum duration of time. For example, a typical Wireless Gigabit Alliance ("WiGig") implementation may take up to three milliseconds, with an overall systems tradeoff of implementation complexity and power. Even for more optimized beamforming procedures, the triggering of the beamforming procedure occurs either in a predetermined period, or in response to link deterioration. Either way, this consumes higher power and imposes recovery latency.

In some cases, the beamforming protocol must be reattempted during device operation. During the training protocol, no user data can be transmitted, which results in a high risk of user-observable latency. Real-time sensitive data, such as video or graphics streaming, suffer from such latency. In the case of a head mounted display, a streaming display video is tightly constrained with respect to latency and jitter as key performance indicators (KPI). For example, the key performance indicator for latency may be less than 10 milliseconds, and the key performance indicator for jitter may be less than 4 milliseconds.

In light of these constraints, there is a need to limit the frequency of the training protocol, and to increase the speed of reaching a satisfactory beamforming setting. Prior efforts have been aimed at identifying beamforming settings that are unlikely to be satisfactory, and removing same from the possible iterations of beamforming settings that will be attempted during a training protocol. Yet, even where potentially undesirable beamforming settings are identified and excluded from the training protocol, a training protocol must still be implemented in response to link deterioration.

SUMMARY

Beamforming is used in wireless link communication to improve a wireless link through increased channel capacity and diversity by focusing a beam, such as from multiple antennas in the direction of the receiver. Where the receiver may be capable of measurements relevant to beamforming, more particularly measurements that vary or are otherwise dependent upon changes in beamforming settings, reference to such measurements and corresponding beamforming settings may improve performance. For example, in the case of mobile devices capable of precise spatial positioning, the precise location of the device may provide a meaningful reference for one or more beamforming settings, due to an observed predictability/repeatability in the directionality of beamforming. Moreover, where such positioning data may be routinely transmitted in real time between a source device implementing a beamforming and a sink device receiving a beamformed signal, this spatial positioning data can be used to improve the selection of beamforming settings.

According to aspects of the present disclosure, a source device and a sink device are in wireless communication with one another. The source device transmits a data stream to the sink device including user traffic data for use by the end user, such as video images in the case of a head-mounted display. Likewise, the sink device transmits a data stream including user traffic data to the source device. The end user or traffic data may include precise spatial positioning information such as in the form of location data. This precise spatial positioning information/data may be available on demand, such as where a mobile device includes circuitry for absolute or relative position detection including global positioning system (GPS) circuitry, angular rate sensors or acceleration sensors or other means for resolving its position including its orientation. Additionally, position information may be desirable or necessary for the intended or typical operation or ordinary function of the sink device, such as in the event of a virtual reality device, wherein the positional data is used to determine the appropriate image or other simulated environmental references to be transmitted to the sink device.

In addition to the precise spatial positioning data, the sink device may also evaluate the wireless link quality and transmit information about this evaluation to the source device. Where the source device receives evaluation of the link quality and the precise spatial location of the sink device, this data can be stored and used to predict potentially satisfactory beamforming settings.

Due to multiple variables, a wireless link may deteriorate from time to time, which may necessitate a change in beamforming setting. Where a new beamforming setting is desired, the source device can search a database containing at least prior positional data of the sink device and the beamforming settings that correspond to the prior positions. A beamforming setting that was previously successful when then sink device was in close proximity to the sink device's current location may have a high likelihood of success. Attempting a beamforming setting having such an indicia may reach a satisfactory result faster than attempting an array of beamforming settings according to a less adaptive approach, such as in accordance with a pre-established training protocol or at random. Furthermore, the proximity/location and/or relative or absolute position data can be combined with additional data, such that a beamforming setting could be chosen based on proximity or position; the historical beamforming setting(s) with the best prior wireless link quality; or simply the most recent satisfactory beamforming setting. Yet another possibility is to discretize the positional data into discrete areas, and then search for stored beamforming settings that correspond to positions in identical or nearby areas.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 11 shows a stored table comprising location, corresponding heading, corresponding beamforming settings, corresponding quality, and corresponding time.

DETAILED DESCRIPTION

Figure 1:
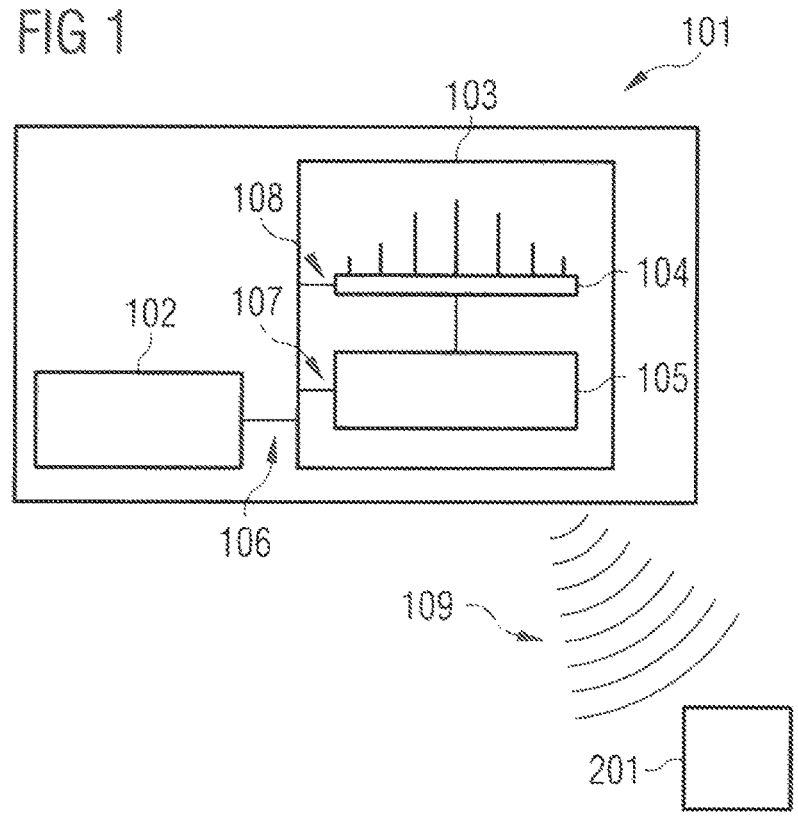
FIG. 1 shows a schematic diagram of a source unit according to an aspect of the disclosure.

The following detailed description refers to the accompanying drawings that show, by way of illustration, specific details and aspects in which the present disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

FIG. 1 shows a source unit 101 in wireless communication with a sink device 201. The source unit comprises a memory 102, wherein at least position data of the sink device and the corresponding beamforming settings may be stored. The source unit further comprises a transceiver 103 to receive and transmit communication from/to sink device 201; an antenna unit 104 to receive and transmit data; and a beamforming control unit 105 to select beamforming settings in accordance with the procedures described herein, and to control transmission through antenna unit 104 to perform and control beamforming. Beamforming control unit 105 may communicate with memory 102, as shown in 106 and 107, to access stored data or save data in memory, wherein such data may comprise location, heading, beamforming setting, and/or link quality. The transceiver may communicate with the memory, as shown in 106, to access stored data or save data in memory, wherein such data may comprise location, heading, beamforming setting, and/or link quality. Transceiver 103 may also communicate with the beamforming control unit, as shown in 107, to coordinate transmissions according to the beamforming settings. Alternatively, transceiver 103 may communicate with antenna unit 104, as shown in 108. Source unit 101 is connected to sink device 201 through a wireless link 109, which is typically transmitted using beamforming to direct the transmission to the sink device and/or to improve the quality or reliability of wireless link 109.

Source device 101 according to an aspect of the disclosure, comprises at least one wireless transceiver 103. Wireless transceiver 103 further comprises antenna unit 104 and beamforming control unit 105, configured to apply a beamforming setting to antenna unit 104. The antenna unit may comprise any number of multiple antennas, or may comprise a single antenna structure capable of functioning in a diverse mode, i.e. in a diverse manner separately addressable and/or controllable by control unit 105. Beamforming control unit 105 may employ conventional beamforming techniques such as to control the phase and relative amplitude of the multiple antennas or antenna components to increase the directionality and/or signal strength profile diversity of wireless link 109, for example to improve the signal quality and/or reliability in communicating with sink device 201.

Figure 2:
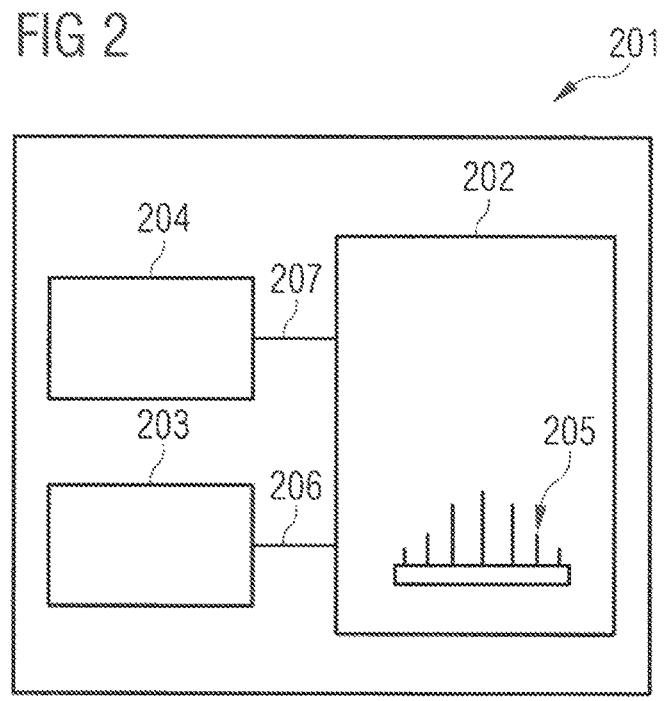
FIG. 2 shows a schematic diagram of a sink unit according to an aspect of the disclosure.

FIG. 2 shows sink device 201 in greater detail, and further comprises a wireless transceiver 202 configured for communication over wireless link 109 with source unit 101. Position detector 204 is configured to detect a position of sink device 201 relative to the source unit 101. Alternately, position detector 204 may detect an absolute position relative to a fixed reference, such as by GPS, or may detect its own movement over time, such as via gravity sensor, accelerometer or angular rate sensor, and may determine its absolute or relative position by dead reckoning, or in combination with other indications of position. Link quality circuit 203 is configured to determine a link quality of wireless link 109, wherein source unit 101 selects a beamforming setting for transmission to sink device 201 based on at least one of the detected position and/or the determined link quality. The wireless transceiver 202 is configured to communicate with the link quality circuit 203 over connection 206. The wireless transceiver 202 is further configured to communicate with the position detector 204 over connection 207.

Figure 3:
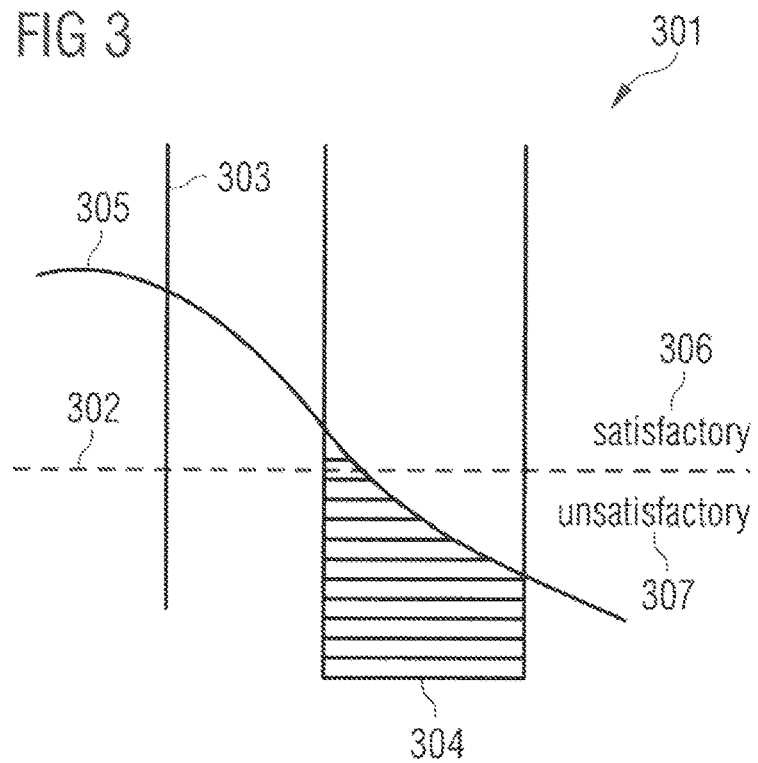
FIG. 3 shows evaluations of a changing wireless link quality.

FIG. 3 shows an evaluation of a wireless data link 301 based on a change in quality. A threshold value 302 delineates ranges of acceptability for the wireless link. At a specific time point 303 and a range of time 304, the quality of a wireless data link 305 is measured. At point 303, the quality falls within the satisfactory range 306. Over the range of time 304, the wireless link falls within the unsatisfactory range 307. The results of this analysis can be stored in memory as the data corresponding to the quality of the wireless link that is measured, or alternatively as the result of the evaluation as satisfactory or unsatisfactory.

Figure 4:
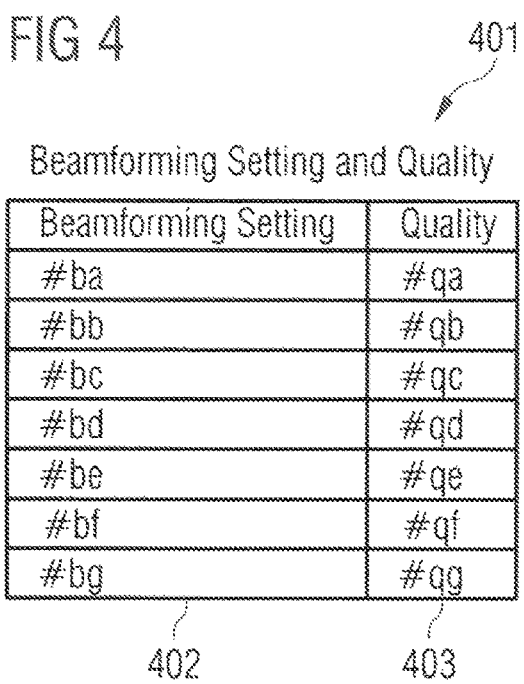
FIG. 4 shows a stored table comprising beamforming settings and corresponding wireless link quality.

FIG. 4 shows the results of the wireless link quality evaluation being stored in memory. Specifically, FIG. 4 shows a beamforming/quality table 401 comprising beamforming settings 402 and various measurements of the qualities of the wireless data link 403 that correspond to said beamforming settings.

According to an aspect of the disclosure, population of a table or database with historical information regarding signal quality corresponding to beamforming settings 401 provides a basis upon which the device according to the present disclosure may improve the effectiveness of beamforming. Such a table includes at least stored beamforming settings 402 and corresponding stored wireless link quality 403. The additional integration in the table or database of position data provides an additional potentially relevant factor. As noted above, the instant disclosure takes advantage of the observed tendency of beamforming to produce predictable or reproducible results when applied under similar conditions. Where one or more of these conditions can be measured and stored, effective selection of beamforming settings can be enhanced. According to some aspects of the disclosure, the evaluation of the wireless link may be stored in an entry corresponding to the determined position of the sink device, the source device, or the sink device relative to the source device.

Figure 5:
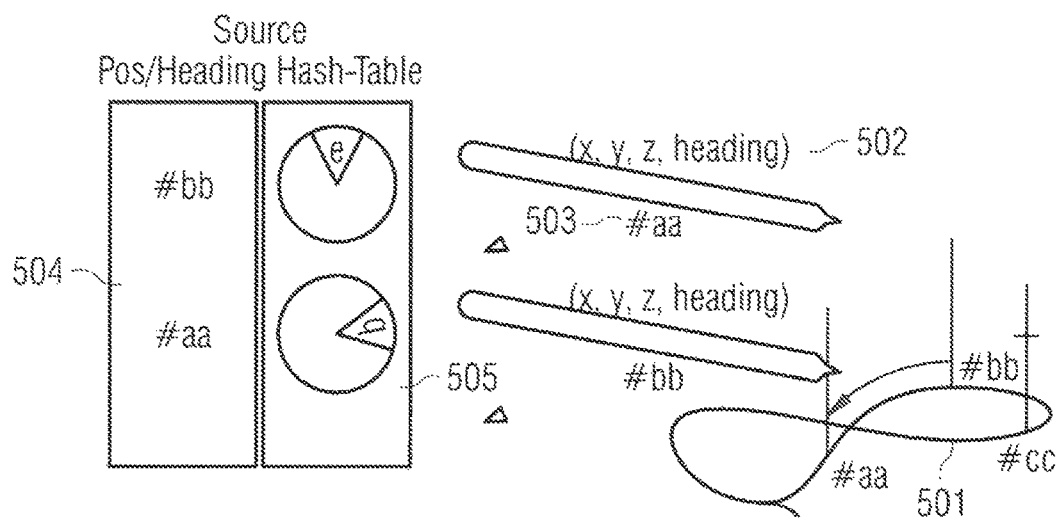
FIG. 5 shows the determination of position of a sink device or source device; the identification of location and/or heading data; the conversion of same into hash table entries; and the saving of data or hash table entries in a table.

FIG. 5 shows the location detection function of the sink device and the storing of the corresponding location data in a table. The location is determined in a three-dimensional range 501 and assessed for its position on x, y, z planes. The location can be expressed via a a data point on the x, y, z plane 502 or as a keyed hash entry 503. The data is stored in a table containing at least the location data 504. The data may also be stored in the table with corresponding heading data 505.

Table 505, or a table with additional information, may be populated with various entries during efforts to establish an initial beamforming setting. Where initial beamforming settings are attempted in response to position data, each attempted beamforming setting can be stored with the corresponding position and the resulting wireless link quality. This data may serve as a meaningful basis for future efforts to select a satisfactory beamforming setting. Alternatively, where beamforming settings are attempted without respect to the position, the position information is still available from the sink device, and this data can be received by the source and stored with the attempted beamforming setting and resulting wireless link quality.

Figure 6:
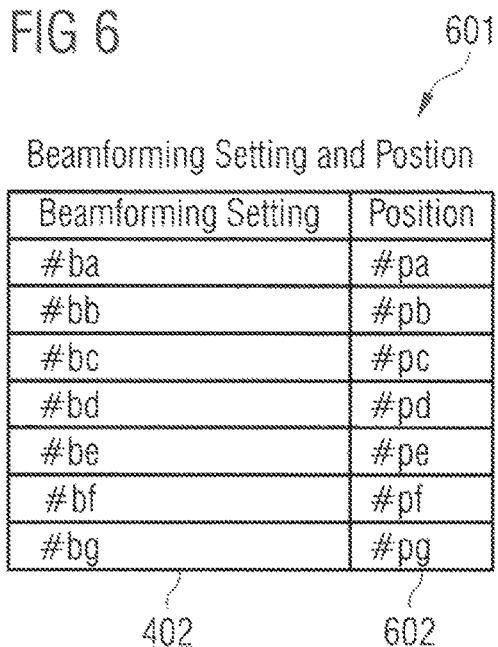
FIG. 6 shows a stored table comprising beamforming settings and corresponding position.

FIG. 6 shows a beamforming setting and position table 601. This table comprises at least beamforming setting entries 402 and their corresponding position entries 602. This data set permits the correlation of beamforming setting with position and therefore takes advantage of the predictability and reproducibility of beamforming settings. Where a beamforming setting was previously satisfactory for a given position, said beamforming setting is likely to be satisfactory again for a same or similar position.

Figures 7, 8:
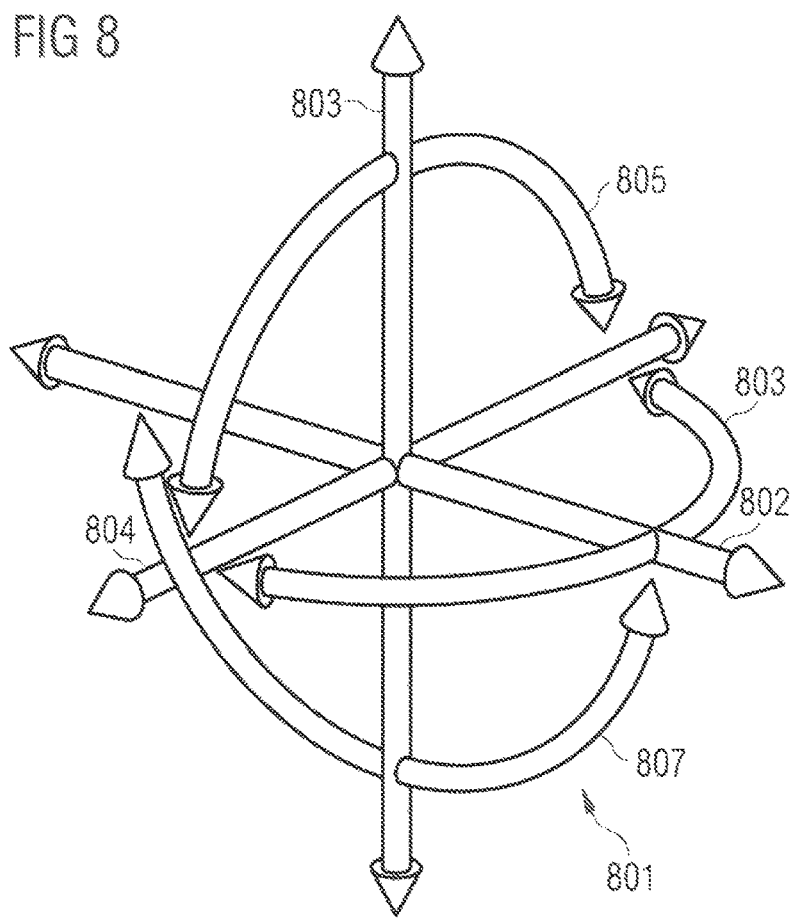
FIG. 7 shows a stored table comprising position, corresponding beamforming settings, and corresponding quality.
FIG. 8 shows an x-axis, a y-axis, and a z-axis for determining location information, as well as three rotational vectors for determining heading.

FIG. 7 shows a position, beamforming setting, and quality table 701. This table comprises at least position entries 602, the corresponding beamforming setting entries 402, and the corresponding wireless link quality entries 403. The addition of data link quality information allows for a more detailed evaluation of the relationship between position and beamforming setting. Where multiple beamforming settings were previously used in close proximity to a given position, the additional of quality data permits for the beamforming settings in close proximity that yielded the greatest quality to be tried first. Alternatively, in the event that position data could not be considered in selecting a candidate beamforming setting, the additional of quality data would permit candidate beamforming settings that previously provided a good result to be selected.

FIG. 8 comprises the location and heading data 801, alternatively known as six degrees of personal freedom information. This comprises an x-axis 802, a y-axis 803, a z-axis 804, a rotational vector for roll 805, a rotational vector for yaw 806, and a rotational vector for pitch 807. For the purposes of this disclosure, positon data can be separated into location and heading data. The location data is determined by the sink or source device's position on an x, y, and z axis. The heading data may comprise three degrees of rotational vectors, comprising roll 805, yaw 806, and pitch 807. These rotational vectors may be named phi, theta, and psi. These rotational vectors may be Euler angles. The location and heading data, together, may comprise six degrees of personal freedom information.

Figures 9, 10:
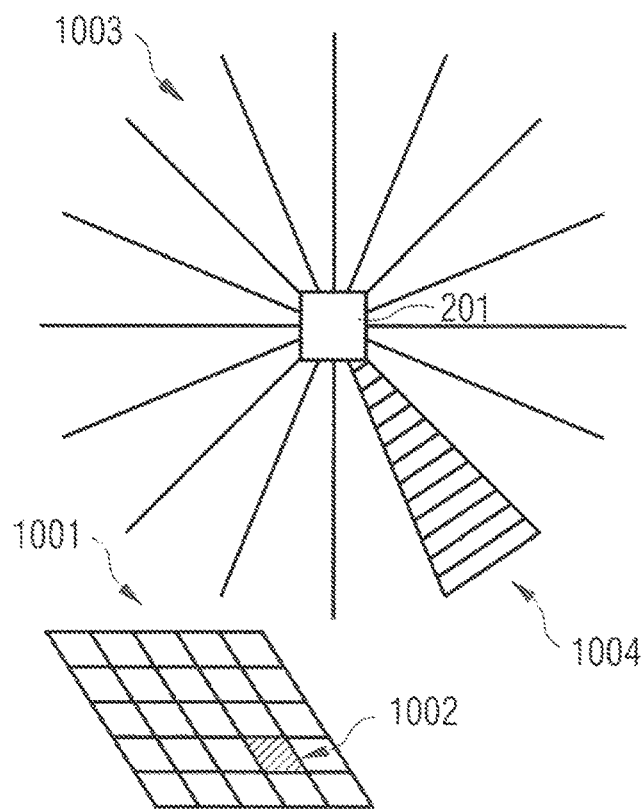
FIG. 9 shows a stored table comprising location, corresponding heading, corresponding beamforming settings, and corresponding quality.
FIG. 10 shows discretization of the location and heading entries of the source device or sink device.

FIG. 9 shows a location, heading, beamforming setting, and quality table 901. This table comprises at least location entries 502, the corresponding heading entries 902, the corresponding beamforming setting entries 402, and the corresponding wireless link quality entries 403. The ability to separate location and heading data permits for the selection of a candidate beamforming setting based the source or sink device's location or the direction it is facing. Furthermore, where only the location or heading of a source or sink device is similar to the stored data, this permits weighing of the similar variable (source or sink) in light of the differences in the other variable.

FIG. 10 shows the discretization of the position data. The location of the source or sink device can be discretized into distinct areas 1001, wherein the area, rather than the specific point where the source or sink is located 1002 is stored in memory. With respect to heading, the environment around a source or sink device can be discretized into areas defined by angles around the source or sink device 1003, wherein the area, rather than the specific vector, of the source or sink device 1004 is stored in memory. The x, y, and/or z location can be discretized, for example, to square or cubic areas 1001. Rather than being associated with a specific coordinate, the sink or source device can instead be identified based on the specific square or cubic area that it inhabits 1002. Similarly, with respect to headings, the area around a source or sink device can be discretized to a range of degrees, as shown in 1003. Rather than the heading being described in terms of three vectors, the heading can be described in terms of the range of angles in which the source or sink is facing 1004. This discretization may be completed to a fraction of a mandated precision. The determined position may be discretized to an angular precision or resolution of plus or minus 5 degrees, or plus or minus 10 cm. Discretizing the data permits the positional information of the source device and/or sink device to be mapped to a location within a specified tolerance. As referenced above, this may include 5 degree angles from the source device, 10 cm cubic volumes, or any other measurement. The source device position data, the sink device position data, or both, may be discretized. Although 1002 and 1004 are shown in two-dimensions, they can also be evaluated in three-dimensions.

Once discretized, the discretized position may be stored in memory by the source device, rather than, or in addition to, storing the exact position. A stored discretized position may create additional queries for a candidate beamforming setting, such as searing for beamforming settings that correspond to the same discretized position as the sink device; or beamforming settings that correspond to discretized positions that are adjacent to the sink device; or discretized positions that are with a specified distance or degree from the sink device's discretized position.

FIG. 11 shows a location, heading, beamforming setting, quality, and time table 1101. This table comprises at least location entries 502, the corresponding heading entries 902, the corresponding beamforming setting entries 402, the corresponding wireless link quality entries 403, and the corresponding time entries for when the beamforming setting was evaluated 1102.

Figure 12:
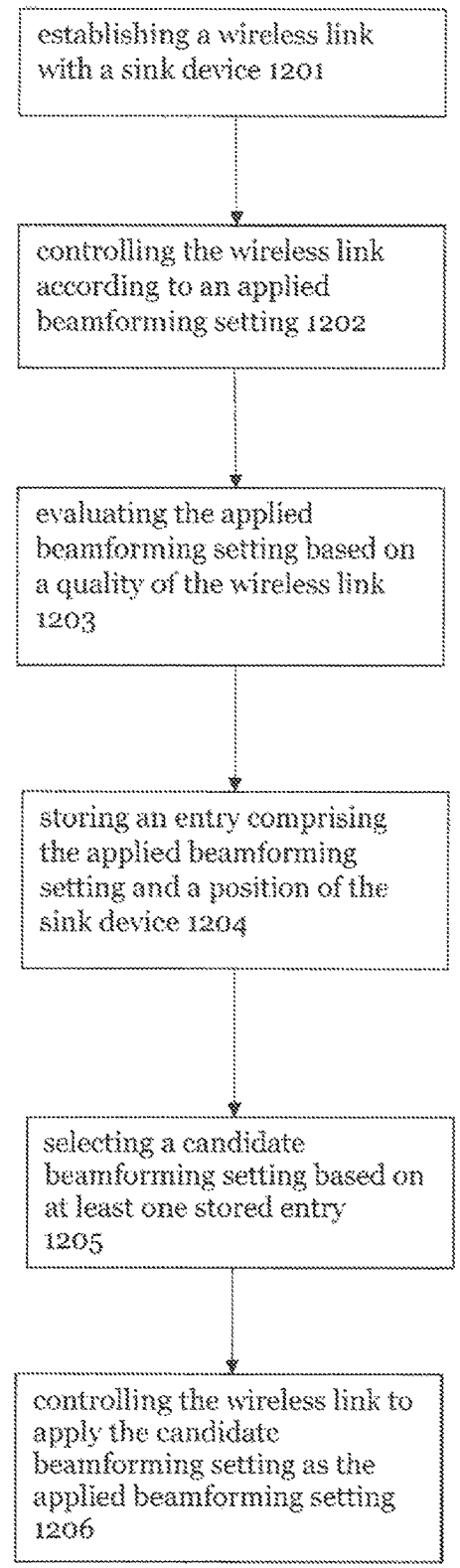
FIG. 12 shows a method of selecting beamforming settings using positional data according to an aspect of the disclosure.

FIG. 12 shows a method of selecting beamforming settings comprising establishing a wireless link with a sink device 1201; controlling the wireless link according to an applied beamforming setting 1202; evaluating the applied beamforming setting based on a quality of the wireless link 1203; storing an entry comprising the applied beamforming setting and a position of the sink device 1204; selecting a candidate beamforming setting based on at least one stored entry 1205; and controlling the wireless link to apply the candidate beamforming setting as the applied beamforming setting 1206.

Figure 13:
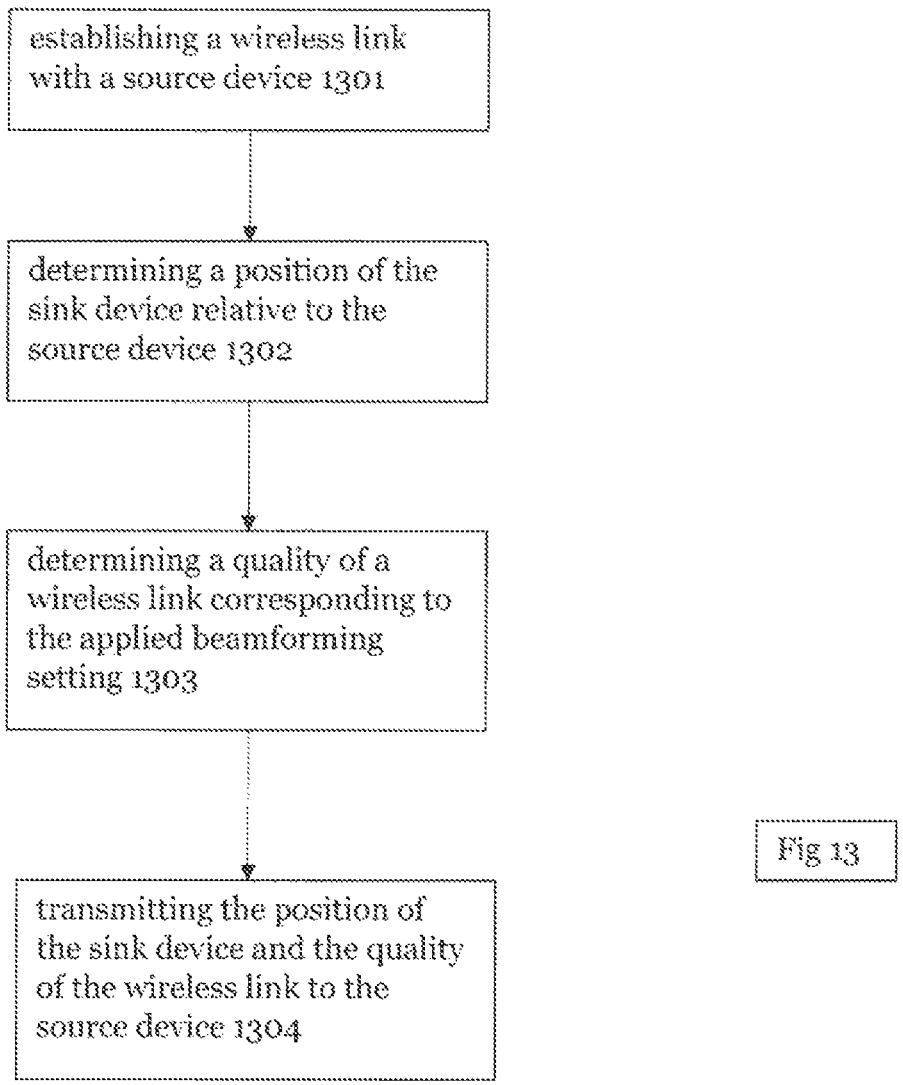
FIG. 13 shows a second method of selecting beamforming settings using positional data according to an aspect of the disclosure.

FIG. 13 shows a method of selecting beamforming settings comprising establishing a wireless link with a source device 1301; determining a position of the sink device relative to the source device 1302; determining a quality of a wireless link corresponding to the applied beamforming setting 1303; and transmitting the position of the sink device and the quality of the wireless link to the source device 1304.

Figure 14:
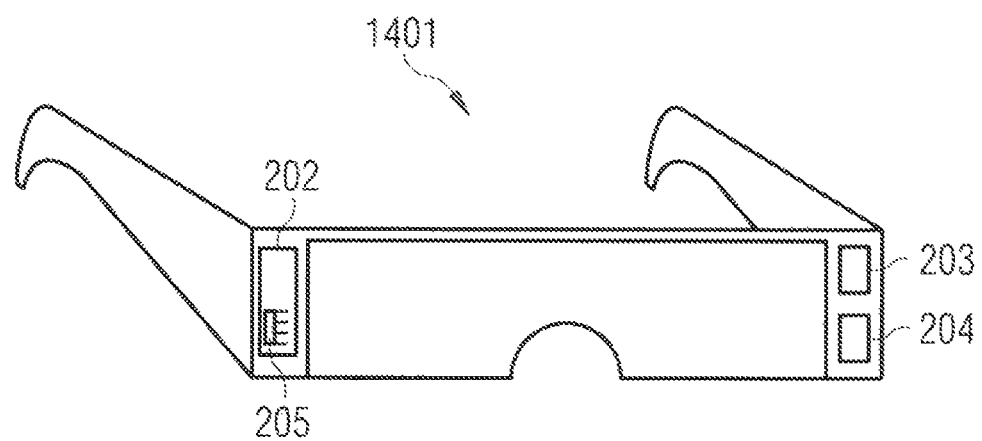
FIG. 14 shows a schematic diagram of a head mounted display according to an aspect of the disclosure.

FIG. 14 shows a further aspect of the disclosure, wherein the sink device is alternatively configured as head mounted display 1401. In the case of a head mounted display, the location and heading data may change rapidly. The positional tracking accuracy of a head-worn mobile device is typically under 1 mm, and the rotational accuracy is typically under 1 degree. For game play, typical head rotation velocity is expected to be 60 degrees per second and could peak at around 600 degrees per second. The angular error of the predicted head pose can vary depending on the prediction interval. For a 20 ms prediction interval, the angular error can be an average of 0.075 degrees, and as poor as 0.35 degrees. For a 40 ms prediction interval, these numbers can increase to an average of 0.17 degrees, and they can be as significant as 0.5 degrees. In the case of a head mounted display, the user may change the head pose while stationary or moving. Such shifting in head pose may make the tracking, transmitting, and storing of heading data in three rotational vectors especially important.

Where the terms "position" or "positional" are used in this disclosure, they refer to location data and/or heading data, wherein the location may describe the relative or absolute three-dimensional location of the source and/or sink device, i.e. relative to each other or in an absolute position relative to a fixed point of reference, and wherein the heading describes the direction that the source device and/or the sink device is pointing. The heading may also include absolute or relative headings.

An apparatus according to this disclosure may control a wireless link by storing positional data of the source device, the sink device, or both. The positional data may be relative, such that the positional data demonstrates the position of the sink device and/or source device relative to one another. The positional data may contain discrete coordinates or other means to identify the location of the source device and/or the sink device.

According to an aspect of the disclosure, sink device 201's position detector 204 determines the position of the sink device relative to an established or pre-determined frame of reference. For example, where sink device 201 is used in conjunction with source unit 101 for a virtual reality application, the user's position upon starting the application may become the reference point against which changes in position are measured. In such an implementation, position detector 204 may determine relative position, such as the position of the sink device relative to the source device at startup, or the position of the sink device relative to a fixed or movable object in the environment where the sink device is located. Other known techniques may be applied to calculate the relative position including location and/or orientation of the source unit 101 and sink device 201 relative to one another, or more precisely, the relative positions of antenna 104 of source unit 101 and antenna 205 of sink device 201 relative to one another, based on the output of position detector 204.

Sink device 201 is configured to selectively transmit its position, or more precisely the position information detected by position detector 204, to the source device, for example over wireless link 109. The position information, or the position derived therefrom may be transmitted continuously, periodically, at intervals, according to a schedule, or as triggered in response to a request issued by source device 101, or at the initiative of sink device 201, such as when requested by a user of sink device 201. Particularly, where images or video data related to a virtual environment are transmitted from the source device to the sink device, the sink device's position may be necessary to configure the images or video that correspond to the particular location and/or heading of the sink device. Where a smooth interface relies on this information, or where movement of sink device 201 is frequent, correspondingly frequent transmission of position data and/or position information derived therefrom may comprise a significant portion of the data transmitted over wireless link 109. Where such data is necessary to the application or game in use by the user interacting with sink device 201, the position data may be considered to be part of the user data traffic transmitted over wireless link 109.

Sink device 201 comprises a link quality circuit 203 to determine the quality of wireless link 109. Where beamforming is employed by source unit 101, the output of link quality circuit 203 may also be considered to correspond to the current beamforming setting, for example as a measure of the effectiveness of the beamforming setting employed. Link quality circuit 203 determines the quality of the wireless link, where quality data derived from the determination is then transmitted to source device 101, such as over wireless link 109. Wireless link quality may be measured by a variety of factors comprising Received Signal Strength Indication, Forward Error Correction Decoder, Bit Error Rate, or ACK/NACK counters. Other measures of link quality may be used or combined with the above.

The wireless link quality data are transmitted to the source device, such as over wireless link 109. Such transmission may be continuous, periodic, scheduled, triggered, or in response to a request issued, for example, by source unit 101. The sink device may, according to an aspect of the disclosure, determine a quality of the wireless link corresponding to the initial or current beamforming setting and then transmit said quality, as an aggregate of the measured indicators and/or with the raw data to the source device, where it may be further processed and/or stored.

In accordance with an aspect of the disclosure, the source device may store the wireless link quality data, such as in memory 102 for future reference. More particularly, to the extent that link quality data may serve, for example, as an indication of the effectiveness of a particular beamforming setting, or as a relative indication of the effectiveness of a plurality of beamforming settings, an indication of link quality may be relevant to a future selection of suitable or alternate beamforming settings by source unit 101. Storing quality data with the corresponding beamforming setting would therefore be advantageous.

Processing in the source device may include an evaluation of the initial or current beamforming setting by determining whether the beamforming setting is satisfactory or unsatisfactory based on a threshold, such as relative signal strength or error rate. The source device may further store the wireless link evaluation. The wireless link evaluation may be stored in relation to other data, such as position (location and heading), the beamforming setting, and or the wireless link quality as an entry corresponding to the determined position. In general, it may be advantageous according to at least one aspect of the current disclosure for the stored entries to be indexed or retrievable by time, for example such that the position and/or signal quality and/or other relevant data corresponding to the particular beamforming setting employed at a given time can be known and retrieved. Other indexing or data linking/processing including statistical analysis of the stored data will also be recognized as potentially advantageous for identification of candidate beamforming settings consistent with aspects of the disclosure.

According to a further aspect of the disclosure, source device 101 may evaluate the current beamforming setting based on the measured quality 301 of the wireless link. According to an aspect of the disclosure, the evaluation may be achieved based on a threshold value 302 for one or an aggregate of several quality indicators, including but not limited to Received Signal Strength Indication, Forward Error Correction Decoder, Bit Error Rate, or ACK/NACK counters. For example, a threshold may advantageously be a predetermined relative signal strength based on an instantaneous measurement 303, or an indication of a trend over a period of time 304. Likewise, a predetermined error rate, or other indicator, may be advantageously employed. The quality of the wireless link may be determined to be satisfactory or unsatisfactory based on the threshold, however, specific measurements may advantageously be stored, or the binary evaluation of the wireless link may also be stored. The threshold may be a value higher than the value at which unacceptable latency will be experienced. That is, the value at which a wireless link becomes unacceptable may be greater than the value at which the device's function becomes unacceptable. In light of this distinction, an evaluation of a wireless link can be triggered based on a variety of events, such as the quality indicators above, a deterioration or sudden change in link quality or signal strength, or a change in quality over time.

According to a further aspect of the disclosure, the candidate beamforming setting may be selected as being the most recent satisfactory applied beamforming setting, or the most recently applied beamforming setting exceeding a threshold. This may be achieved by storing in memory the time that a beamforming setting was used, as is shown in FIG. 11. The time corresponding to a beamforming setting 1102 can be stored as an entry in memory in a table such that it corresponds to at least a beamforming setting. The source device may then search the stored entries for the most recent, satisfactory, applied beamforming setting. Alternatively, the time that a beamforming setting was used may be omitted where the stored entries contain data that permit them to be sorted chronologically. Under this system, even where the exact times of the beamforming setting's implementation could not be identified, the most recent beamforming settings would still be apparent.

According to at least FIGS. 4, 6, 7, 9, and 11, rather than blindly trying an array of beamforming settings, it may be advantageous to select candidate beamforming settings based on criteria that show some likelihood of yielding a satisfactory beamforming result. This is achieved by the source device assessing the stored data and selecting a candidate beamforming setting based on the stored data. Once a candidate beamforming setting is selected, the source device controls the wireless link to apply the candidate beamforming setting. In this manner, the candidate beamforming setting becomes the applied beamforming setting.

According to a further aspect of the disclosure, a candidate beamforming setting is selected based on an evaluation of the quality of the wireless link. Because said evaluations are stored in memory, as shown in at least FIGS. 4, 6, 7, 9, and 11, as multiple beamforming settings are attempted and evaluated, a data set emerges which can be used to evaluate the likelihood of success of a given beamforming setting. This is based, in part, on the observed tendency of beamforming to produce predictable or reproducible results when applied under similar conditions. Where one or more of these conditions can be measured and stored, effective selection of beamforming settings can be enhanced. Where successive candidate beamforming settings are attempted, an updated quality of the wireless link corresponding to the candidate beamforming setting as applied is assessed. The evaluation of the candidate beamforming setting as applied may be stored in memory.

The evaluation of the candidate beamforming setting may be stored in memory with an updated position of the sink device. In situations where the position of the source device and the sink device has not changed, the determined position and the updated position may be the same. Where the position of the source or sink may be in flux, storing the evaluation of the candidate beamforming setting is given increased utility when said evaluation is stored with accurate position information. Therefore, the source device may obtain or receive updated position information and store same in connection with the evaluation of the candidate beamforming setting. Moreover, where the source device is also in motion, the source device may store its own position. This position may be stored in the same table or databased as the sink device's position information. Alternatively, the source device's position information may be stored in a separate database or table, such that it is linked to or reference with the sink device's position information, for later computation and reference.

It may become necessary or desirable to change the beamforming setting in the course of operation. Where either of the source or sink device is mobile, a static beamforming setting may not consistently provide a necessary or desirable minimum signal strength or link quality. Even where the source or sink device is not mobile, a static beamforming setting may become undesirable. The movement of persons or objects within an environment, a change of heading, or simply the passage of time may cause a given beamforming setting to yield less than ideal results. Moreover, even where an acceptable link quality currently exists, a different beamforming setting may achieve better or more stable results. Under these circumstances, it may be desirable to change the beamforming setting.

The quality of the wireless link may change or remain the same between evaluations. Although the quality of the wireless link may not remain static over periods of time, as shown in FIG. 3, the quality of the wireless link may remain unchanged, or essentially unchanged, between successive evaluations. Where the quality of the wireless link is unchanged or substantially unchanged, the source device may be programmed to evaluate and store the evaluation of the wireless link as described above, to maximize the data set available for future selection of candidate beamforming settings. Alternatively, the source device may be programmed not to store the quality of wireless links that remain unchanged or substantially unchanged from prior determinations. This may serve as a conservation measure, to limit the need for memory, to reduce the calculations necessary to identify a candidate beamforming setting, or to otherwise dedicate fewer resources to the evaluation and storage of data.

In other situations, the quality of the wireless link may change significantly between determinations. This may occur where beamforming setting initially allows for a satisfactory link quality, and where said link quality later deteriorates, such as when there is significant change in the sink device's position. An unsatisfactory wireless link may trigger a change in the beamforming setting, and this change in the beamforming setting may create a significant improvement in the wireless link quality. This may be described as a change in the determined quality and the updated quality.

Upon determining an updated quality, the source device may perform an updated evaluation of the current beamforming setting. This is performed by assessing whether the updated quality exceeds a threshold 302, such as signal strength or error rate, as shown in FIG. 3. Where the signal strength is greater than a threshold or the error rate falls beneath a threshold, the beamforming setting can be evaluated as satisfactory. Conversely, where the signal strength is less than a threshold, or the error rate is greater than a threshold, the beamforming setting can be evaluated as unsatisfactory. This evaluation of the updated beamforming setting becomes the updated evaluation.

This updated evaluation of the current beamforming setting may then be stored as an entry corresponding to the determined position. This creates a data set of a position, the beamforming setting when the position was determined, and the satisfactory or unsatisfactory nature of the corresponding beamforming setting when the position was determined. In another embodiment, the quality of the wireless data link may be stored as an entry corresponding to the determined position. This creates a data set where the position corresponds to the beamforming setting, and a quality of the wireless link such as signal strength or error rate. In another embodiment, the quality of the wireless data link and the evaluation of the wireless link may be stored as entries corresponding to the determined position. This creates a data set where the position corresponds to the beamforming setting, a quality of the wireless link such as signal strength or error rate, and an evaluation of the beamforming setting as being satisfactory or unsatisfactory.

Candidate beamforming settings are selected based on at least one stored entry. In one embodiment, the selected candidate beamforming setting is the beamforming setting with the greatest corresponding wireless link quality. This embodiment contemplates the source device evaluating the data set for the beamforming setting that provided the best wireless link quality and selecting same as the candidate beamforming setting to attempt. In this case, the candidate beamforming setting would be a single beamforming setting. The source device may also order the data set by wireless link quality. Depending on the data set, this may result in list or an ordered set of candidate beamforming settings, such as where multiple prior beamforming settings provided high wireless link quality. The candidate beamforming settings could alternatively be ordered according to preference, and a predetermined number of beamforming settings could be selected and attempted.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

Any of the disclosed apparatuses or methods may be performed by a means for wireless link control and recovery using positional data, and said means are hereby disclosed herein.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device.

Likewise, it is appreciated that implementations of devices detailed herein are understood as capable of being implemented as a corresponding method. It is thus understood that a device corresponding to a method detailed herein may include a one or more components configured to perform each aspect of the related method.

The following examples pertain to further aspects of this disclosure:

In Example 1, a method of wireless link control in a source device is disclosed, comprising:
establishing a wireless link with a sink device;
controlling the wireless link according to an applied beamforming setting;
evaluating the applied beamforming setting based on a quality of the wireless link;
storing an entry comprising the applied beamforming setting and a position of the sink device;
selecting a candidate beamforming setting based on at least one stored entry; and
controlling the wireless link to apply the candidate beamforming setting as the applied beamforming setting.

In Example 2, a method of wireless link control in a sink device is disclosed, comprising:
establishing a wireless link with a source device;
determining a position of the sink device relative to the source device;
determining a quality of a wireless link corresponding to the applied beamforming setting;
transmitting the position of the sink device and the quality of the wireless link to the source device.

In Example 3, a method of selecting beamforming settings in a source device using positional data is disclosed, said method comprising:
applying a first beamforming setting for transmission to a sink device;
assessing user traffic data from the sink device for a position of the sink device;
storing an entry comprising the first beamforming setting and a position of the sink device;
selecting a candidate beamforming setting based on evaluation of the stored entry;
and applying the candidate beamforming setting.

In Example 4, a method of controlling beamforming settings using positional data is disclosed, said method comprising:
establishing a wireless link with a source device;
determining a quality of the wireless link;
transmitting to a source device the location of the sink device and the quality of the wireless link.

In Example 5, the method of Example 1 or 3 is disclosed, wherein the source device applies the candidate beamforming setting as the applied beamforming setting and controls the wireless link accordingly.

In Example 6, the method of Example 5 is disclosed, further comprising the wireless link being controlled to apply the candidate beamforming setting as the applied beamforming setting by using a two-way control or ACK message.

In Example 7, the method of Example 1 or 3 is disclosed, further comprising the source device evaluating the quality of the wireless link quality.

In Example 8, the method of Example 1 or 3 is disclosed, further comprising the source device selecting and implementing the candidate beamforming setting with zero-time prediction.

In Example 9, the method of Example 1, 3, 5, or 8 is disclosed, further comprising the source device selecting and implementing the candidate beamforming setting without creating user-detectable latency in the sink device.

In Example 10, the method of Example 1, 3, 8, or 9 is disclosed, further comprising the source device selecting and implementing the candidate beamforming setting without an end-user recognizable interruption in the transmission of the user traffic data.

In Example 11, the method of Example 9 or 10 is disclosed, further comprising the source device selecting and implementing the candidate beamforming setting without interrupting transmission of the user traffic data, or with only minimally interrupting transmission of user traffic data.

In Example 12, the method of Example 2 or 4 is disclosed, further comprising determining a quality of the wireless link corresponding to the applied beamforming setting using a Received Signal Strength Indication.

In Example 13, the method of Example 2 or 4 is disclosed, further comprising determining a quality of the wireless link corresponding to the applied beamforming setting using a Forward Error Correction Decoder.

In Example 14, the method of Example 2 or 4 is disclosed, further comprising determining a quality of the wireless link corresponding to the applied beamforming setting using a Bit Error Rate.

In Example 15, the method of Example 2 or 4 is disclosed, further comprising determining a quality of the wireless link corresponding to the applied beamforming setting using acknowledgement/non-acknowledgement counters.

In Example 16, the method of Example 2 or 4 is disclosed, further comprising the sink device transmitting the position of the sink device relative to the source device in the sink device's user traffic data.

In Example 17, the method of Example 1 or 3 is disclosed, further comprising the source device performing a beamforming training, wherein the source device:
attempts an array of beamforming settings;
stores for each of one or more attempted beamforming settings, an entry comprising the beamforming setting and a quality of the wireless link corresponding to the beamforming setting; and
selects a candidate beamforming setting based on at least one stored entry.

In Example 18, the method of Example 2 or 4 is disclosed, further comprising a beamforming training is disclosed, wherein the sink device:
transmits in a wireless link with the source device, according to an array of beamforming settings;
determines for each of the array of beamforming settings, a quality of the wireless link; and
transmits to the sink device for each of the beamforming settings the quality of the wireless link.

In Example 19, the method of Example 17 is disclosed, further comprising the source device performing the beamforming training while the sink device is in motion.

In Example 20, the method of Example 17 is disclosed, further comprising the source device instructing the sink device to change locations during the beamforming training.

In Example 21, the method of Example 17 is disclosed, further comprising the source device instructing the sink device to change positions during the beamforming training.

In Example 22, the method of Example 18 is disclosed, further comprising the sink device changing locations during the beamforming training.

In Example 23, the method of Example 22 is disclosed, further comprising the sink device changing locations in response to an instruction from the source device.

In Example 24, the method of Example 17 is disclosed, further comprising applying a next beamforming setting based on an evaluation of the wireless link quality.

In Example 25, the method of Example 17 is disclosed, further comprising the source device receiving a quality of the wireless link for each attempted beamforming setting.

In Example 26, the method of Example 18 is disclosed, further comprising the sink device transmitting a quality of the wireless link for each attempted beamforming setting.

In Example 27, the method of Example 17 is disclosed, further comprising the source device conducting a beamforming training while the source device is stationary.

In Example 28, the method of Example 17 is disclosed, further comprising the source device conducting a beamforming training while the source device is in motion.

In Example 29, the method of Example 17 is disclosed, further comprising the source device conducting a beamforming training while the sink device is stationary.

In Example 30, the method of Example 17 is disclosed, further comprising the source device conducting a beamforming training while the sink device is in motion.

In Example 31, the method of Example 17 is disclosed, further comprising the source device conducting a beamforming training while both the source device and the sink device are in motion.

In Example 32, the method of Example 18 is disclosed, further comprising the sink device undergoing a beamforming training while the source device is stationary.

In Example 33, the method of Example 18 is disclosed, further comprising the sink device undergoing a beamforming training while the source device is in motion.

In Example 34, the method of Example 18 is disclosed, further comprising the sink device undergoing a beamforming training while the sink device is stationary.

In Example 35, the method of Example 18 is disclosed, further comprising the sink device undergoing a beamforming training while the sink device is in motion.

In Example 36, the method of Example 18 is disclosed, further comprising the sink device undergoing a beamforming training while both the source device and the sink device are in motion.

In Example 37, the method of Example 17 is disclosed, further comprising the source device instructing a user of the sink device to place the sink device in specific locations while beamforming settings are attempted.

In Example 38, the method of any one of Examples 17, 27 to 31, or 37 is disclosed, further comprising the source device performing a beamforming training protocol upon initial establishment of a link between the source device and the sink device.

In Example 39, the method of Example 17 is disclosed, further comprising the source device initiating a beamforming training protocol upon the deterioration of the wireless link.

In Example 40, the method of Example 18 is disclosed, further comprising the sink device initiating a beamforming training protocol upon the deterioration of the wireless link.

In Example 41, the method of Example 39 is disclosed, further comprising the source device predicting a beamforming setting based on at least one stored entry before initiating a beamforming training protocol.

In Example 42, the method of Example 1 or 3 is disclosed, further comprising the source device selecting a candidate beamforming setting in response to a wireless link deterioration.

In Example 43, the method of Example 1 or 3 is disclosed, further comprising the source device seeking a next candidate beamforming setting in response to the wireless link quality falling beneath a threshold.

In Example 44, the method of Example 1 or 3 is disclosed, further comprising the source device selected a candidate beamforming setting in response to an evaluation of the wireless link.

In Example 45, the method of Example 44 is disclosed, wherein the evaluation is unsatisfactory.

In Example 46, the method of Example 2 or 4 is disclosed, further comprising the sink device determining a wireless link deterioration.

In Example 47, the method of Example 46 is disclosed, further comprising the wireless link deterioration being determined by assessing Received Signal Strength Indication.

In Example 48, the method of Example 46 is disclosed, further comprising the wireless link deterioration being determined by assessing Forward Error Correction Decoder.

In Example 49, the method of Example 46 is disclosed, further comprising the wireless link deterioration being determined by assessing Bit Error Rate.

In Example 50, the method of Example 46 is disclosed, further comprising the wireless link deterioration being determined by assessing ACK/NACK counters.

In Example 51, the method of Example 1 or 3 is disclosed, further comprising the source device selecting a beamforming setting with the closest proximity to the current position as the candidate beamforming setting.

In Example 52, the method of Example 51 is disclosed, wherein the candidate beamforming setting is a single beamforming setting.

In Example 53, the method of Example 51 is disclosed, wherein the candidate beamforming setting is an ordered set of beamforming settings.

In Example 54, the method of Example 16 is disclosed, further comprising the source device leveraging the user traffic data to improve the selection of beamforming settings.

In Example 55, the method of Example 16 or 54 is disclosed, wherein the source device uses data that is normally transmitted from the sink device to the source device to select a candidate beamforming setting.

In Example 56, the method of Example 11 is disclosed, wherein the use of user traffic data to choose a candidate beamforming setting results in reduction of latency.

In Example 57, the method of Example 2 or 4 is disclosed, further comprising the determined position including at least one of:

three points on an x, y, and z plane;

three degrees of rotational vectors; or six degrees of personal freedom information.

In Example 58, the method of any of Examples 2, 4 or 57 is disclosed, further comprising the determined position of the sink device being a discretized position.

In Example 59, the method of Example 58 is disclosed, further comprising the discretized position being discretized to an angular precision or resolution of plus or minus 5 degrees, or plus or minus 10 cm.

In Example 60, the method of Example 1 or 3 is disclosed, further comprising selecting a candidate beamforming setting based on a relationship between a discretized position of the sink device and a stored discretized positon in at least one stored entry corresponding to the candidate beamforming setting.

In Example 61, the method of Example 1, 3, or 60 is disclosed, further comprising selecting a candidate beamforming setting based on a relationship between the determined position or a discretized position of the sink device and a stored discretized positon in at least one stored entry corresponding to the candidate beamforming setting.

In Example 62, the method of Example 1 or 3 is disclosed, further comprising selecting a candidate beamforming setting based on a relationship between a stored determined position associated with beamforming setting and the position of the sink device.

In Example 63, the method of Example 2 or 4 is disclosed, further comprising the sink device determining a signal strength.

In Example 64, the method of Example 63 is disclosed, further comprising the sink device transmitting the signal strength to the source device.

In Example 65, the method of Example 1 or 3 is disclosed, further comprising the source device storing a signal strength in memory with a corresponding beamforming setting.

In Example 66, the method of Example 1 or 3 is disclosed, further comprising the source device storing an error rate in memory with a corresponding beamforming setting.

In Example 67, the method of Example 1 or 3 is disclosed, further comprising the source device storing in memory a time during which a specific beamforming setting was used.

In Example 68, the method of Example 67 is disclosed, further comprising the source device selecting a candidate beamforming setting based on recency of the beamforming setting.

In Example 69, the method of Example 1 or 3 is disclosed, further comprising storing with the entry comprising the applied beamforming setting and the determined position, at least one of:
the quality of the wireless link
the evaluation of the applied beamforming setting
the time that the beamforming setting was applied; or
the chronology of the beamforming setting with respect to an earlier applied beamforming setting.

In Example 70, the method of any of Example 65 is disclosed, wherein the source device selects a candidate beamforming setting based on having provided the best signal strength.

In Example 71, the method of Example 66 is disclosed, wherein the source device selects the candidate beamforming setting based on error rate.

In Example 72, the method of Example 70 or 71 is disclosed, further comprising the source device selecting multiple candidate beamforming settings based on signal strength or error rate.

In Example 73, the method of Example 1 or 3 is disclosed, wherein the source device selects a candidate beamforming setting based on at least one of wireless link quality, wireless link evaluation, signal strength, error rate, and proximity.

In Example 74, the method of Example 1 or 3 is disclosed, wherein no stored beamforming entries provide indicia of success, and beamforming settings are attempted at random.

In Example 75, the method of Example 1 or 3 is disclosed, further comprising storing the duration that a given beamforming setting was in use.

In Example 76, the method of Example 75 is disclosed, wherein a candidate beamforming setting is selected based on at least duration.

In Example 77, the method Example 1 or 3 is disclosed, further comprising the source device ordering stored beamforming settings by proximity.

In Example 78, the method of Example 1 or 3 is disclosed, further comprising the source device ordering stored beamforming settings by proximity between a corresponding prior location of the sink device and a current location of the sink device.

In Example 79, the method of Example 63 is disclosed, wherein multiple prior beamforming settings correspond to a prior location of a sink device and a current location of the sink device, and the source device selects an ordered set of candidate beamforming settings therefrom.

In Example 80, the method of Example 1 or 3 is disclosed, further comprising selecting a candidate beamforming setting based on a relationship between a position of the sink device and at least one of the following:
a stored quality of the wireless link
a stored evaluation of the applied beamforming setting
a stored time that the beamforming setting was applied;
a stored chronology of the beamforming setting with respect to an earlier applied; or
a stored determined position associated with beamforming setting.

In Example 81, the method of Example 1 or 3 is disclosed, further comprising employing an algorithm to search the stored entries to select a candidate beamforming setting.

In Example 82, the method of Example 81 is disclosed, further comprising said algorithm assessing at least one of wireless link quality, wireless link evaluation, signal strength, error rate, or proximity.

In Example 83, the method of Example 81 or 82, further disclosing the algorithm weighing multiple criteria to select a candidate beamforming setting.

In Example 84, the method of Example 1 or 3 is disclosed, further comprising selecting a candidate beamforming setting based on similarity between a stored determined position associated with beamforming setting and a current position of the sink device.

In Example 85, the method of Example 1 or 3 is disclosed, further comprising eliminating a candidate beamforming setting from consideration as a candidate beamforming setting because of a prior unsatisfactory evaluation.

In Example 86, the method of Example 85 is disclosed, wherein one or more stored entries containing beamforming settings with a corresponding unsatisfactory wireless link evaluation are eliminated from consideration for candidate beamforming settings.

In Example 87, the method of Example 85 or 86 is disclosed, wherein the elimination of a prior beamforming setting as a candidate beamforming setting increases a likelihood of selecting a satisfactory candidate beamforming setting.

In Example 88, the method of any one of Examples 85 to 87 is disclosed, further comprising a beamforming setting being excluded or pruned from future selection as a candidate beamforming setting.

In Example 89, the method of Example 1 or 3 is disclosed, further comprising the source device selecting candidate beamforming settings from a beamforming codebook.

In Example 90, the method of Example 8 is disclosed, further comprising implementing the codebook beamforming setting.

In Example 91, the method of Example 1 or 3 is disclosed, further comprising a spatial invariance of the source device.

In Example 92, the method of Example 91 is disclosed, further comprising the spatial invariance resulting in a faster beamforming setting above a specified threshold.

In Example 93, the method of Example 2 or 4 is disclosed, further comprising a spatial invariance of the sink device.

In Example 94, the method of Example 93 is disclosed, further comprising the spatial invariance resulting in a faster beamforming setting above a specified threshold.

In Example 95, the method of any of Examples 1 to 4 is disclosed, further comprising a change in position or location of the source device resulting in a diminished wireless link quality.

In Example 96, the method of any of Examples 1 to 4 is disclosed, further comprising a change in position or location of the sink device resulting in a diminished wireless link quality.

In Example 97, the method of any one of Examples 95 to 96 is disclosed, further comprising a change in location or position delaying implementation of a satisfactory candidate beamforming setting.

In Example 98, the method of Example 91 or 93 is disclosed, wherein the spatial invariance results in a faster implementation of a satisfactory beamforming setting.

In Example 99, the method of Example 1 or 3 is disclosed, further comprising the source device storing the beamforming setting as an absolute setting.

In Example 100, the method of Example 1 or 3 is disclosed, further comprising the source device storing the beamforming setting as a beamforming codebook setting.

In Example 101, the method of Example 1 or 3 is disclosed, further comprising the source device storing in memory any one of an attempted beamforming setting, a resulting wireless link quality, or an evaluation of the beamforming setting.

In Example 102, the method of any one of Examples 1, 3, or 99 to 101 is disclosed, further comprising the stored entry being stored in a table.

In Example 103, the method of Example 102 is disclosed, wherein the table comprises any one of beamforming settings, position data, location data, heading data, discretized position data, discretized location data, discretized heading data, timing data, wireless link quality data, wireless link quality evaluations, and/or codebook entries.

In Example 104, the method of Example 102 or 103 is disclosed, further comprising the table being a hash table.

In Example 105, the method of Example 102 or 103 is disclosed, further comprising the table being a keyed hash table.

In Example 106, the method of Example 104 or 105 is disclosed, further comprising the source device converting a three-dimensional position entry on an x, y, z plane to a hash entry before storing.

In Example 107, the method of Example 104 or 105 is disclosed, further comprising the sink device converting a three-dimensional position entry on an x, y, z plane to a hash entry before transmitting to the source device.

In Example 108, the method of Example 1 or 3 is disclosed, further comprising the source device being equipped with a position detector to detect the source device's position.

In Example 109, the method of Example 108 is disclosed, further comprising the source device storing its positional data in a table.

In Example 110, the method of Example 1 or 3 is disclosed, further comprising the source device storing data from multiple sink devices.

In Example 111, the method of Example 1, 3 or no is disclosed, further comprising storing with the entry comprising the applied beamforming setting and the determined position, at least one of:
the quality of the wireless link;
an evaluation of the applied beamforming setting;
a time that the beamforming setting was applied; or
a chronology of the beamforming setting with respect to an earlier applied beamforming setting.

In Example 112, the method of Example 1 or 3 is disclosed, further comprising the source device establishing a wireless link with at least two sink devices.

In Example 113, the method of Example 2 or 4 is disclosed, further comprising at least two sink devices transmitting to the source device.

In Example 114, the method of any one of Examples 1, 2, 3, or 4 is disclosed, further comprising the source device and the sink device being a gaming system.

In Example 115, the method of Example 114 is disclosed, further comprising multiple sink devices permitting multiple players at one time.

In Example 116, the method of Example 115 is disclosed, further comprising the source device receiving position data from each sink device.

In Example 117, the method of Example 116 is disclosed, further comprising the source device receiving wireless link quality from each sink device.

In Example 118, the method of Example 112 is disclosed, further comprising the source device storing data from at least two sink devices.

In Example 119, the method of Example 112 or 118 is disclosed, further comprising the source device assessing data from at least two sink devices to select a candidate beamforming setting.

In Example 120, the method of Example 1 or 3 is disclosed, further comprising the source device transmitting to the sink device via Wi-Fi or WiGig.

In Example 121, the method of Example 2 or 4 is disclosed, further comprising the sink device transmitting to the source device via Wi-Fi or WiGig.

In Example 122, the method of Example 121 is disclosed, wherein at least two sink devices transmit using Wi-Fi or WiGig.

In Example 123, the method of Example 122 is disclosed, further comprising the transmission resulting in high path loss due to the high frequency.

In Example 124, the method of any of Examples 1 to 4 is disclosed, further comprising the sink device being a drone.

In Example 125, the method of Example 124 is disclosed, further comprising at least two drones communicating with a source device.

In Example 126, the method of Example 124 or 125 is disclosed, further comprising the drone being stationary.

In Example 127, the method of Example 124 or 125 is disclosed, further comprising the drone being in motion.

In Example 128, the method of Example 124 or 125 is disclosed, further comprising the source device being stationary.

In Example 129, the method of Example 124 or 125 is disclosed, further comprising the source device being in motion.

In Example 130, the method of Example 2 or 4 is disclosed, further comprising the sink device comprising a camera or video camera.

In Example 131, the method of Example 2, 4, or 130 is disclosed, wherein the sink device transmits an image from the camera or video camera to the source device.

In Example 132, the method of Example 1, 3, or 131 is disclosed, further comprising the source device using camera-image registration or video-image registration for positional data.

In Example 133, the method of Example 2 or 4 is disclosed, further comprising the sink device being a head mounted display.

In Example 134, the method of Example 133 is disclosed, wherein a latency constraint of streaming video from the head mounted display is less than 10 milliseconds.

In Example 135, the method of Example 133 is disclosed, wherein a jitter key performance indicator of streaming video from the head mounted display is less than 4 milliseconds.

In Example 136, a method of wireless link control for a source device is disclosed, the method comprising:
establishing a wireless link with a sink device;
storing an applied beamforming entry in a memory;
selecting a candidate beamforming setting based on at least one stored entry; and
controlling the wireless link to apply the candidate beamforming setting as the applied beamforming setting.

In Example 137, the method of Example 136 is disclosed, further comprising evaluating an applied beamforming setting based on a quality of the wireless link, and storing the evaluation of the applied beamforming setting in the memory.

In Example 138, an apparatus for wireless link control is disclosed, the apparatus comprising:
a source device, and
a sink device, wherein,
the source device is configured to:
control a wireless link with a sink device according to an applied beamforming setting;
evaluate the applied beamforming setting based on a quality of the wireless link;
store an entry comprising the applied beamforming setting and a position of the sink device;
select a candidate beamforming setting based on at least one stored entry; and
control the wireless link to apply the candidate beamforming setting as the applied beamforming setting;
and wherein the sink device is configured to:
determine a position of the sink device relative to the source device;
determine a quality of a wireless link corresponding to the applied beamforming setting; and
transmit the position of the sink device and the quality of the wireless link to the source device.

In Example 139, an apparatus for wireless link control is disclosed, the apparatus comprising a source device, wherein the source device is configured to:
control a wireless link with a sink device according to an applied beamforming setting;
evaluate the applied beamforming setting based on a quality of the wireless link;
store an entry comprising the applied beamforming setting and a position of the sink device;
select a candidate beamforming setting based on at least one stored entry; and control the wireless link to apply the candidate beamforming setting as the applied beamforming setting.

In Example 140, an apparatus for wireless link control is disclosed, the apparatus comprising a sink device, wherein the sink device is configured to:
determine a position of the sink device relative to the source device;
determine a quality of a wireless link corresponding to the applied beamforming setting; and
transmit the position of the sink device and the quality of the wireless link to the source device.

In Example 141, the Apparatus of Example 138 or 140 is disclosed, further comprising the sink device being a head mounted display.

In Example 142, the apparatus of Example 138, 140, or 141 is disclosed, further comprising the sink device being configured to transmit a location to the source device.

In Example 143, the apparatus of any one of Examples 138 or 140 to 142 is disclosed, further comprising the sink device being configured to transmit the quality of the wireless link to the source device.

In Example 144, the apparatus of Example 139 is disclosed, further comprising the source device being configured to select a beamforming setting based on a recency of prior beamforming settings.

In Example 145, the apparatus of Example 139 is disclosed, further comprising the source device being configured to store an entry comprising the position of the sink device relative to the source device and the beamforming setting.

In Example 146, the apparatus of Example 139 is disclosed, wherein the entry further comprises any one of the following: a quality of the wireless link; an evaluation of the applied beamforming setting; a time that the beamforming setting was applied; or a chronology of the beamforming setting with respect to an earlier applied beamforming setting.

In Example 147, a method of wireless link control is disclosed, the method comprising:
establishing a wireless link between a source device and a sink device;
determining a position of the sink device relative to the source device;
controlling the wireless link according to an applied beamforming setting;
determining a quality of the wireless link corresponding to the applied beamforming setting;
evaluating the applied beamforming setting based on the quality of the wireless link;
storing an entry comprising the applied beamforming setting and the determined position;
selecting a candidate beamforming setting based on at least one stored entry; and
controlling the wireless link to apply the candidate beamforming setting as the applied beamforming setting.

In Example 148, a method of selecting beamforming settings using positional data is disclosed, said method comprising:
applying a first beamforming setting of a source device for transmission to a sink device;
assessing user traffic data from the sink device for a position of the sink device;
determining a link quality between the sink device and the source device;
storing an entry comprising the beamforming setting and a determined position of the sink device;
selecting a candidate beamforming setting based on evaluation of the stored entry;
and applying the candidate beamforming setting to the at least one source device.

In Example 149, a means for wireless link control of a source device is disclosed, wherein said means:
establishes a wireless link with a sink device;
controls the wireless link according to an applied beamforming setting;
evaluates the applied beamforming setting based on a quality of the wireless link;

stores an entry comprising the applied beamforming setting and a position of the sink device;
selects a candidate beamforming setting based on at least one stored entry; and
controls the wireless link to apply the candidate beamforming setting as the applied beamforming setting.

In Example 150, a means for wireless link control of a sink device is disclosed, wherein said means:
establishes a wireless link with a source device;
determines a position of the sink device relative to the source device;
determines a quality of a wireless link corresponding to the applied beamforming setting; and
transmits the position of the sink device and the quality of the wireless link to the source device.

In Example 151, a non-transient computer readable medium containing program instructions for causing a computer to perform the method of:
establishing a wireless link with a sink device;
controlling the wireless link according to an applied beamforming setting;
evaluating the applied beamforming setting based on a quality of the wireless link;
storing an entry comprising the applied beamforming setting and a position of the sink device;
selecting a candidate beamforming setting based on at least one stored entry; and controlling the wireless link to apply the candidate beamforming setting as the applied beamforming setting.

In Example 152, a non-transient computer readable medium containing program instructions for causing a computer to perform, the method of:
establishing a wireless link with a source device;
determining a position of the sink device relative to the source device;
determining a quality of a wireless link corresponding to the applied beamforming setting;
transmitting the position of the sink device and the quality of the wireless link to the source device.

In Example 153, a non-transient computer readable medium containing program instructions for causing a computer to perform the method of:
applying a first beamforming setting for transmission to a sink device;
assessing user traffic data from the sink device for a position of the sink device;
storing an entry comprising the first beamforming setting and a position of the sink device;
selecting a candidate beamforming setting based on evaluation of the stored entry; and
applying the candidate beamforming setting.

In Example 154, a non-transient computer readable medium containing program instructions for causing a computer to perform the method of:
establishing a wireless link with a source device;
determining a quality of the wireless link;
transmitting to a source device the location of the sink device and the quality of the wireless link.

In Example 155, a machine readable medium including code is disclosed, which, when executed, causes a machine to perform any one of the methods listed above.

What is claimed is:

1. A method of wireless link control in a source device, comprising:
establishing a wireless link with a sink device;
controlling the wireless link according to an applied beamforming setting;
evaluating the applied beamforming setting based on a quality of the wireless link;
storing an entry comprising the applied beamforming setting and a position of the sink device, wherein the position includes three degrees of rotational vectors and a discretized position associated with an area of a plurality of areas in a two-dimensional space or a volume of a plurality of volumes in a three-dimensional space;
selecting a candidate beamforming setting based on at least one stored entry; and
controlling the wireless link to apply the candidate beamforming setting as the applied beamforming setting.

2. A method of wireless link control in a sink device, comprising:
establishing a wireless link with a source device;
determining a position of the sink device relative to the source device, wherein the determined position includes three degrees of rotational vectors and a discretized position associated with a specific area of a plurality of areas in a two-dimensional space or a specific volume of a plurality of volumes in a three-dimensional space;
determining a quality of a wireless link corresponding to an applied beamforming setting; and
transmitting the position of the sink device and the quality of the wireless link to the source device.

3. The method of claim 2, further comprising determining a quality of the wireless link corresponding to the applied beamforming setting using a Received Signal Strength Indication.

4. The method of claim 2, further comprising determining a quality of the wireless link corresponding to the applied beamforming setting using a Forward Error Correction Decoder.

5. The method of claim 2, further comprising determining a quality of the wireless link corresponding to the applied beamforming setting using a Bit Error Rate.

6. The method of claim 2, further comprising determining a quality of the wireless link corresponding to the applied beamforming setting using acknowledgement/non-acknowledgement counters.

7. The method of claim 2, further comprising the sink device transmitting the position of the sink device relative to the source device in the sink device's user traffic data.

8. The method of claim 1, further comprising the source device performing a beamforming training, wherein the source device:
attempts an array of beamforming settings;
stores for each of one or more attempted beamforming settings, an entry comprising the beamforming setting and a quality of the wireless link corresponding to the beamforming setting; and
selects a candidate beamforming setting based on at least one stored entry.

9. The method of claim 1, further comprising the source device selecting a candidate beamforming setting in response to a wireless link deterioration.

10. The method of claim 9, further comprising the wireless link deterioration being determined by assessing Received Signal Strength Indication.

11. The method of claim 9, further comprising the wireless link deterioration being determined by assessing Forward Error Correction Decoder.

12. The method of claim 9, further comprising the wireless link deterioration being determined by assessing Bit Error Rate.

13. The method of claim 9, further comprising the wireless link deterioration being determined by assessing ACK/NACK counters.

14. The method of claim 1, further comprising the source device selecting a beamforming setting with the closest proximity to the current position as the candidate beamforming setting.

15. The method of claim 1, further comprising the discretized position being discretized to an angular precision or resolution of plus or minus 5 degrees, or plus or minus 10 cm.

16. The method of claim 1, further comprising storing with the entry comprising the applied beamforming setting and the determined position, at least one of:
the quality of the wireless link;
the evaluation of the applied beamforming setting;
the time that the beamforming setting was applied; or
the chronology of the beamforming setting with respect to an earlier applied beamforming setting.

17. The method of any of claim 1, wherein the source device selects a candidate beamforming setting based on having provided the best signal strength.

18. The method of claim 1, wherein the source device selects the candidate beamforming setting based on error rate.

19. The method of claim 1, further comprising employing an algorithm to search the stored entries to select a candidate beamforming setting.

20. The method of claim 1, further comprising the source device storing data from at least two sink devices.

21. An apparatus for wireless link control comprising a source device, wherein the source device is configured to:
control a wireless link with a sink device according to an applied beamforming setting;
evaluate the applied beamforming setting based on a quality of the wireless link;
store an entry comprising the applied beamforming setting and a position of the sink device, wherein the position includes at least one of three degrees of rotational vectors and a discretized position associated with a specific area of a plurality of areas in a two-dimensional space or a specific volume of a plurality of volumes in a three-dimensional space;
select a candidate beamforming setting based on at least one stored entry; and
control the wireless link to apply the candidate beamforming setting as the applied beamforming setting.

22. An apparatus for wireless link control comprising:
a position detector configured to determine a position of the sink device relative to the source device, wherein the determined position includes three degrees of rotational vectors and a discretized position associated with a specific area of a plurality of areas in a two-dimensional space or a specific volume of a plurality of volumes in a three-dimensional space;
a link quality circuit configured to determine a quality of a wireless link corresponding to an applied beamforming setting; and
a transceiver configured to transmit the position of the sink device and the quality of the wireless link to the source device.

23. The Apparatus of claim 22, further comprising a bridge and at least one extension configured to rest on a user's head.

24. The method of claim 1, the entry further comprising a time at which the applied beamforming setting was applied or a chronology of the applied beamforming setting with respect to an earlier applied beamforming setting at the discretized position.

* * * * *